United States Patent
Barchers

(10) Patent No.: US 8,575,528 B1
(45) Date of Patent: Nov. 5, 2013

(54) SYSTEM AND METHOD FOR COHERENT PHASED ARRAY BEAM TRANSMISSION AND IMAGING

(76) Inventor: Jeffrey D. Barchers, Boulder, CO (US)

(*) Notice: Subject to any disclaimer, the term of this patent is extended or adjusted under 35 U.S.C. 154(b) by 480 days.

(21) Appl. No.: 13/038,584

(22) Filed: Mar. 2, 2011

Related U.S. Application Data

(60) Provisional application No. 61/309,953, filed on Mar. 3, 2010.

(51) Int. Cl.
G01J 1/20 (2006.01)
(52) U.S. Cl.
USPC .......................... 250/201.9; 356/484; 356/521
(58) Field of Classification Search
USPC ................ 250/227.19, 227.27, 201.9, 201.1, 250/578.1; 356/345, 357, 349; 359/22, 23, 359/34
See application file for complete search history.

(56) References Cited

U.S. PATENT DOCUMENTS

| | | | |
|---|---|---|---|
| 4,937,539 A | 6/1990 | Grinberg et al. | |
| 5,026,977 A * | 6/1991 | Hubbard, Jr. | 250/201.9 |
| 6,040,857 A | 3/2000 | Hirsh et al. | |
| 6,115,123 A | 9/2000 | Stappaerts et al. | |
| 6,204,925 B1 * | 3/2001 | Prikryl et al. | 356/498 |
| 6,452,146 B1 | 9/2002 | Barchers | |
| 6,683,291 B2 | 1/2004 | Barchers | |
| 6,957,099 B1 | 10/2005 | Arnone et al. | |
| 6,982,790 B1 * | 1/2006 | Gershenson | 250/227.19 |
| 7,038,791 B2 | 5/2006 | Smith | |
| 7,333,215 B2 | 2/2008 | Smith | |
| 7,402,785 B2 | 7/2008 | Barchers | |
| 7,405,834 B1 | 7/2008 | Marron et al. | |
| 7,656,539 B1 | 2/2010 | Lee | |
| 8,076,624 B1 | 12/2011 | Barchers | |
| 8,265,375 B2 | 9/2012 | Shirley | |
| 2005/0006559 A1 | 1/2005 | Smith | |
| 2005/0015233 A1 | 1/2005 | Gordon | |
| 2006/0049331 A1 | 3/2006 | Smith | |
| 2007/0012884 A1 * | 1/2007 | Fishkin et al. | 250/458.1 |

OTHER PUBLICATIONS

High Efficiency Liquid-Crystal Optical Phased-Array Beam Steering. DP Resler, DS Hobbs, RC Sharp, LJ Friedman, TA Dorschner. 1996 Optics Letters, vol. 21 pp. 689-691.

Optical Phased-Array beam steering controlled by wavelength. F Xiao, W Hu, A Xu. 2005. Applied Optics. vol. 44, pp. 5429-5433.

A review of Phased Array Steering for Narrow-Band Electro-Optical Systems. PF McMannamom, PJ Bos, MJ escuti, J Heikenfeld, S Serati, H Xie, E. A Watson, 2009, Proc. IEEE, vol. 97.

(Continued)

Primary Examiner — Francis M Legasse, Jr.
(74) Attorney, Agent, or Firm — Patent Law Offices of Rick Martin, P.C.

(57) ABSTRACT

A Coherent Phased Array Beam Transmission and Imaging System is disclosed for end-to-end compensation of a plurality of laser beams through a turbulent medium to a non-cooperative target where the optical device used to transmit and receive laser energy is a plurality of optical transceivers (typically a telescope, but often referred to as a subaperture telescope or transceiver). The Coherent Phased Array Beam Transmission and Imaging System controls the plurality of laser beams (that originate from a single master oscillator laser and are amplified and/or transported using separate beam paths) to coherently combine the outgoing beams from each subaperture to form a single phased beam at the target. The preferred embodiment for the Coherent Phased Array Beam Transmission and Imaging System includes a method to maintain the beam hit spot on the target aim point at the full resolution of the array.

8 Claims, 9 Drawing Sheets

(56) References Cited

OTHER PUBLICATIONS

Laser BEam Projection with adaptive array of fiber collimators, I. Basic Considerations for analysis. MA Voronstov and SL Lachinova. 2008 Journal of the Optical Society of America A. vol. 25 pp. 1949-1959.

Laser Beam Projection with adaptive array of fiber collimators, II. Basic Considerations for Analysis. SL Lachinova, MA Voronstov. 2008 Journal of Optical Society of America A. vol. 25 pp. 1960-1973.

Adaptive Phase-locked fiber array with wavefront phase tip-tilt compensation using piezoelectric fiber positioners. L Liu, MA Voronstov, E Polnau, T Weyrauch, and LA Beresnev. 2007. Proc. SPIE. vol. 6708.

Analytic versus adaptive image formation using optical phased arrays. R Kendrik and J.C. Marron. 2009 Proc. SPIE. , vol. 7468.

Heterodyne array phasing by digital shearing laser interferometry. JR Fienup, JN Cederquist, JC Marron, TJ Schulz, JH Seldin. 1990, Proc. of the Infrared Information Symposium Specialty Group on Active Systems, Ann Arbor, MI, USA.

The multidither principle in adaptive optics. TR O'Meara. 1977. J. Opt Soc. Am., vol. 67, pp. 306-314.

Wave-front estimation from wave-front slope measurements. WH Southwell. 1980. J. Opt Soc. Am., vol. 70, pp. 998-1006.

Quantifications of error propagation in slope-based wavefront estimations. W Zou, JP Rolland. 2006, J. Opt. Soc. Am. A, vol. 23 pp. 2629-2638.

Band-limited wavefront reconstruction with unity frequency response from Shack-Hartmann slopes measurements. S-W. Bank. 2008, Optics Letters, vol. 33, pp. 1321-1323.

Real-Time Correction of Atmostpherically degraded Telescope Images Through Image Sharpness. RA Muler and A Buffington. 1974, J. Opt. Soc. Am., vol. 64, pp. 1200-1210.

Multi-Aperature 3D Imaging Systems. JC Marron and RL Kendrick. 2008 Aerospace Conference 2008 IEEE pp. 1-3.

Evaluation of phase-shifting approaches for a point-diffraction interfermoter with the mutual coherence function. JD Barchers, TA Rhoadarmer. Ded. 2002, Applied Optics, vol. 41, pp. 7499-7509.

Improved Compensation of amplitude and phase fluctuations by means of multiple near field phase adjustments. JD Barchers, BL Ellerbroek. Feb. 2001. J. Opt. Soc. Amer. A, vol. 18, pp. 399-411.

Closed loop stable control of two defomable mirrors for compensation of amplitude and phase fluctuations. JD Barchers. 2002. J Opt. Soc. Amer A, vol. 19, pp. 926-945.

Evaluation of the impact of finite resolution effects on scintillation compensation using two deformable mirrors. Barchers, JD. 2001 J. Opt. Society of America A vol. 18, pp. 3098-3109.

Optical control of laser beams for propagation through a turbulent medium. JD Barchers, DL Fried. Sep. 2002, J. of the Optical Society of America A, vol. 19, pp. 1779-1793.

Optical beam propagation system having adaptive optical systems. Noise analysis for complex field estimation using a self-referencing interferometer wavefront sensor. TA Rhoadarmer and JD Barchers. 2002 Proc SPIE vol. 4825, pp. 215-227.

Ultra compact optical true time delay device for wideband phased array radars. Apr. 23, 2010. BL Anderson, JG Ho, WD Cowan, OB Spahn, AY Yi et al. Proc SPIE 7669, Radar Sensor Technology XIV 76690P.

Barchers, JD U.S. Appl. No. 12/234,041, filed Sep. 19, 2008.

Barchers, JD U.S. Appl. No. 13/038,584, filed Mar. 2, 2011.

* cited by examiner

SYSTEM AND METHOD FOR COHERENT PHASED ARRAY BEAM TRANSMISSION AND IMAGING

CROSS REFERENCE APPLICATIONS

This application is a non-provisional application claiming the benefits of provisional application No. 61/309,953 filed Mar. 3, 2010.

STATEMENT REGARDING FEDERALLY SPONSORED RESEARCH OR DEVELOPMENT

The U.S. Air Force Research Laboratory of the U.S. Government has a license in this invention under the terms as provided for by Contract No. FA9451-11-C-0193.

FIELD OF INVENTION

The present invention relates to a method and system implementation for projection of laser beams through a turbulent medium where the optical device used to transmit and receive laser energy is a plurality of optical transceivers (typically a telescope, but often referred to as a subaperture telescope or transceiver) that are controlled to coherently combine the outgoing beams from each subaperture to form a single phased beam at a target. The target is assumed to be non-cooperative. A non-cooperative target refers to a target in which no laser beacon is provided directly by the target for wavefront sensing.

BACKGROUND OF THE INVENTION

Projection of laser beams requires an aperture diameter, or effective aperture diameter, large enough such that the diffraction limit of the optical system, given by $\lambda L/D$ (where $\lambda$ is the wavelength of light, L is the propagation distance, and D is the aperture diameter), is sufficiently small to provide the required beam size on the target of interest. By the same token, imaging requires that the aperture diameter be large enough such that the diffraction limit is smaller than the object features to be resolved by the imaging system. The size and cost of conventional telescope systems, which utilize a large monolithic mirror, or several large mirror segments, to achieve these requirements can be exorbitant. An alternative technology that has been pursued for many years is that of phased array beam combining and phased array imaging. In a phased array system, a plurality of smaller telescopes are used in a coherent fashion so that the plurality of smaller telescopes, when combined coherently, have the same diffraction limit as a larger conventional telescope.

While this appears on the surface to offer a creative and viable solution to the size and weight problems associated with large aperture optical systems, there is a significant lack of insight and methods for means to actually achieve coherent phasing of the array. While much of the prior art focuses on creative devices for phased array beam control and/or imaging (see references: 1, 2, 3, 4, 5), only a small fraction of prior art focuses on the sensing and control required for active phasing of the array (see references 6, 7, 8, 9). The published methods for beam phasing and imaging utilize hill climbing metric optimization based methods whose performance is heavily dependent on the choice of metric and are usually inherently limited in the speed at which compensation can be achieved.

This is particularly true if the phased array must operate in a real time manner for compensation of the effects of turbulence on laser propagation. In the case of laser propagation, the prior art relies on a closed loop feedback signal that operates over the round trip from the transmitter to the target and back, inherently limiting the characteristic compensation time constant to be at least roughly 20 times slower than the round trip time of flight to the target and back. While this characteristic compensation time may be acceptable for some applications, it is inadequate for the majority of applications and is certainly not adequate for compensation of phasing errors resulting from on board vibration sources. On board vibration sources can be the most significant source of phasing errors—particularly if fiber laser and amplifier systems are used, for which phase aberrations are inherently highly susceptible to both mechanical and acoustic vibration sources. The present invention is relevant to general phased array systems, but in particular focuses on the challenging problems posed by phased arrays of fiber laser systems.

What is needed is a method for coherently combining a plurality of subapertures to phase a plurality of beams at a target. The method must not require a monolithic beam director (which would eliminate the size and weight advantages of the phased array). The method must be capable of being effective with moving targets and platforms. The method must have a means to accomplish isolation of the transmitted beam from a return beam used for measurement of aberrations in the path. The method must not rely on measurements from one wavelength of light to compensate through fiber optical transport at another wavelength of light (this is due to the fact that measurements through fiber can only be measured within a single wavelength—unless an ultra-precise fiber length measurement system is incorporated into the system, in which case such a system must be integrated without a non-common path that passes through fiber optic beam transport). The method must utilize a common reference plane to serve as the "zero phase reference" for the phased array. The method must not have any non-common path that is in fiber optical transport. The method must accommodate a means for on-platform stabilization of high speed, large amplitude aberrations that occur in either a fiber amplifier or due to mechanical/acoustical vibrations. The method must have a means for measurement of the tilt error on each subaperture and must have a means for measurement of the global tilt error of the entire array.

The present invention provides for a means to meet these requirements in an innovative fashion that enables the potential size and weight advantages of coherent phased array laser and imaging systems to be realized.

REFERENCES

1. J. Grinberg, T. R. O'Meara, Y. Owechko, M. E. Pedinoff, B. H. Soffer. Phased Array for Optical Beam Control. U.S. Pat. No. 4,937,539, 26 Jun. 1990.
2. *High-efficiency liquid-crystal optical phased-array beam steering.* D. P. Resler, D. S. Hobbs, R. C. Sharp, L. J. Friedman, and T. A. Dorschner. 1996, Optics Letters, Vol. 21, pp. 689-691.
3. *Optical phased-array beam steering controlled by wavelength.* F. Xiao, W. Hu, and A. Xu. 2005, Applied Optics, Vol. 44, pp. 5429-5433.
4. *A review of Phased Array Steering for Narrow-Band Electro-optical Systems.* P. F. McMannamon, P. J. Bos, M. J. Escuti, J. Heikenfeld, S. Serati, H. Xie, and E. A. Watson. 2009, Proc. IEEE, Vol. 97.
5. *Laser beam projection with adaptive array of fiber collimators, I. Basic considerations for analysis.* M. A.

Vorontsov and S. L. Lachinova. 2008, Journal of the Optical Society of America A., Vol. 25, pp. 1949-1959.
6. *Laser beam projection with adaptive array of fiber collimators, II. Basic considerations for analysis.* S. L. Lachinova and M. A. Vorontsov. 2008, Journal of the Optical Society of America A., Vol. 25, pp. 1960-1973.
7. *Adaptive Phase-locked fiber array with wavefront phase tip-tilt compensation using piezoelectric fiber positioners.* L. Liu, M. A. Vorontsov, E. Polnau, T. Weyrauch, and L. A. Beresnev. 2007, Proc. SPIE, Vol. 6708.
8. *Analytic versus adaptive image formation using optical phased arrays.* R. Kendrick and J. C. Marron. 2009, Proc. SPIE, Vol. 7468.
9. *Heterodyne array phasing by digital shearing laser interferometry.* J. R. Fienup, J. N. Cederquist, J. C. Marron, T. J. Schulz, and J. H. Seldin. 1990, Proc. Of the Infrared Information Symposium Specialty Group on Active Systems, Ann Arbor, Mich.
10. *The multidither principle in adaptive optics.* T. R. O'Meara. 1977, J. Opt. Soc. Am., Vol. 67, pp. 306-314.
11. Compensated coherent imaging for improved imaging and directed energy weapons applications. J. C. Marron, C. W. Embry, A. Oien, D. D. Smith, J. A. Thomson, J. P. Tucker, S. G. L. Williams, U.S. Pat. No. 7,405,834.
12. *Real-Time Correction of Atmospherically Degraded Telescope Images Through Image Sharpness.* R. A. Muller and A. Buffington. 1974, J. Opt. Soc. Am., Vol. 64, pp. 1200-1210.
13. *Multi-Aperture 3D Imaging Systems.* J. C. Marron and R. L. Kendrick. 2008, Aerospace Conference 2008 IEEE, pp. 1-3.

SUMMARY OF THE INVENTION

The primary aspect of the present invention is to provide a System and Method for Coherent Phased Array Beam Transmission and Imaging to measure and correct for aberrations in a laser beam projection system formed by a plurality of optical transceivers (typically a telescope, but often referred to as a subaperture telescope or transceiver).

Another aspect of the present invention is to provide for phase correction from a master oscillator, through a plurality of laser amplifiers, through a plurality of subapertures, and through a turbulent path to a target, strictly by use of phase correction devices in low power beam paths.

Another aspect of the present invention is to maintain the phased beam on the target aimpoint, enabling maximum energy deposition on the target aimpoint. Other aspects of this invention will appear from the following description and appended claims, reference being made to the accompanying drawings forming a part of this specification wherein like reference characters designate corresponding parts in the several views.

The present invention provides a method for end-to-end compensation of a plurality of laser beams through a turbulent medium to a non-cooperative target where the optical device used to transmit and receive laser energy is a plurality of optical transceivers (typically a telescope, but often referred to as a subaperture telescope or transceiver). The Coherent Phased Array Beam Transmission and Imaging System controls the plurality of laser beams (that originate from a single master oscillator laser and are amplified and/or transported using separate beam paths) to coherently combine the outgoing beams from each subaperture to form a single phased beam at the target. The preferred embodiment for the Coherent Phased Array Beam Transmission and Imaging System includes a method to maintain the beam hit spot on the target aimpoint at the full resolution of the array A summary of the present invention can also be described with reference to the Figures below.

1. A Coherent Phased Array Beam Transmission and Imaging System for end-to-end compensation of a plurality of subaperture transceivers that form a plurality of laser beams through a turbulent medium to a non-cooperative target, the system comprising:

A. A first control loop comprising:
a master oscillator producing a master oscillator beam;
a beam splitter to divide said master oscillator beam into a reference beam and a plurality of outgoing beams;
a plurality of first phase modulator control devices functioning to control a phase of each of the plurality of outgoing beams;
a plurality of amplifiers functioning to amplify each of the plurality of outgoing beams;
a plurality of subaperture transceivers functioning to direct the plurality of outgoing beams through a path to a target;
a plurality of return beams reflected from the target back to the plurality of subaperture transceivers functioning to direct the return beams to a plurality of second phase modulator control devices, each functioning to control a phase of the plurality of return beams;
the plurality of second phase modulator control devices passing the plurality of return beams into a sensing assembly which functions to focus a coherent sum of the plurality of return beams onto an internal high speed detector;
said internal high speed detector functioning to produce an electronic signal and pass said electronic signal to a high speed computer;
said high speed computer functioning to control said plurality of second phase modulator control devices in a closed loop fashion to maximize the coherent sum of the plurality of return beams onto the high speed detector;

B. A second control loop comprising:
a third phase modulator receiving said reference beam and directing said reference beam into the sensing assembly;
said sensing assembly then passing the reference beam to the plurality of second phase modulator control devices and into the plurality of subaperture transceivers functioning to form a plurality of interference patterns between the reference beam and the plurality of outgoing beams producing a plurality of detector signals;
said detector signals passed to the high speed computer functioning to control the plurality of first phase modulator control devices such that the phase of an outgoing beam will be locked to a phase of the reference beam at an aperture sharing element within each subaperture transceiver;

C. A third loop comprising:
a return image from the target;
said return image passing through a path to the plurality of subaperture transceivers and focused to a plurality of cameras or detector arrays internal to each subaperture transceiver;
said plurality of subaperture transceivers forming an electronic image signal and passing said electronic image signal to an image processor; and
said image processor controlling a plurality of beam steering devices internal to the plurality of subaperture transceivers functioning to keep the plurality of outgoing beams locked onto the target and to maintain an outgoing beam hit spot on a target aimpoint with a coordinated imaging resolution of the plurality of the subaperture transceiver.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
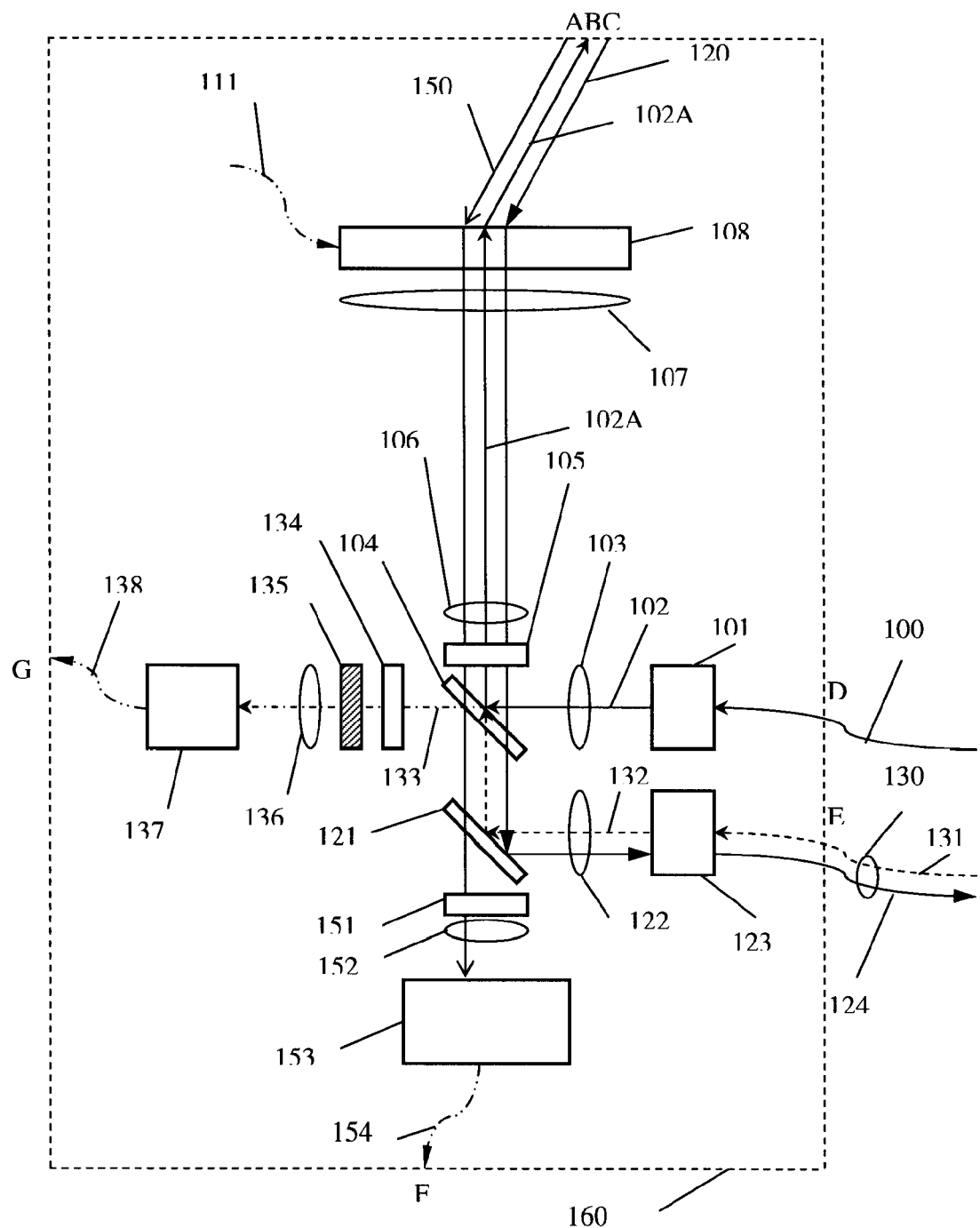
FIG. 1 is a schematic illustrating the elements of a subaperture assembly equipped with the necessary optical components to implement the phasing and imaging method of the present invention; where the subaperture is depicted as having a transmissive beam steering device at the entrance aperture.

FIG. 1 is a schematic illustrating the elements of a subaperture assembly 160 equipped with the necessary optical components to implement the phasing and imaging method of the present invention; where the subaperture is depicted as having a transmissive beam steering device at the entrance aperture. Illustrated are the necessary elements of a subaperture assembly 160 to effect the beam phasing and imaging system of the present invention. FIG. 1 is shown by way of example and not of limitation. There are alternate means of displaying the laser path(s) as those skilled in the art would recognize FIG. 1 illustrates subaperture assembly 160 integrated with a transmissive beam steering device 108. The subaperture assembly 160 consists of an interface for injection of an outgoing beam in fiber 100 in single mode polarization maintaining fiber which is connected to a fiber 2-axis or 3-axis steering and/or focus control assembly 101. Fiber 100, containing outgoing beam 102, terminates at focus control assembly 101 allowing the outgoing beam 102 to expand in free space until it is collimated by collimating lens 103. Outgoing beam 102 is noted to be linearly polarized. Outgoing beam 102 propagates through collimating lens 103 to an aperture sharing element 104, which is highly reflective at the outgoing beam polarization (nominally assumed to be "S" polarized with respect to the aperture sharing element 104) and highly transmissive at the orthogonal polarization (nominally assumed to be "P" polarization with respect to the aperture sharing element 104). Aperture sharing element 104 is also noted to be highly transmissive at the wavelength or wavelength band of the imaging beam 150 (which is discussed in further detail below). The majority outgoing beam 102A then reflects from the aperture sharing element 104 and propagates to a quarter wave plate 105, which converts the polarization of majority outgoing beam 102A from linear to circular polarization. Majority outgoing beam 102A then propagates to a lens 106 (which the reader skilled in the art will note could equally be an appropriately specified mirror) which in conjunction with the lens 107 expands outgoing majority beam 102A to maximize the fill factor of the subaperture assembly 160, where fill factor is the ratio of the size of the majority outgoing beam 102A to the subaperture output diameter. The majority outgoing beam 102A then propagates through a beam steering device 108, which has the ability to control the pointing of the outgoing majority beam 102A. Beam steering control signal 111 includes the x and y tilt commands that control beam steering device 108. There are numerous methods for such a device with multiple trades associated with the operation of such devices. In some cases, the operation of the device will preclude use of circularly polarized light. In these cases, the ordering of the quarter wave plate 105 and the beam steering device 108 can sometimes be reversed in a manner that enables beam steering with the device—such methods are well known to those skilled in the art and are dependent on the specific behavior of the beam steering device 108 selected. The majority outgoing beam 102A then propagates to a target (not shown) where it reflects from the target to form the return beam 120.

Return beam 120 propagates back through beam steering device 108 and lens pair 107 and 106. Upon propagation through the quarter wave plate 105 the polarization is converted from circular back to "P" polarization to enable transmission of return beam 120 through the aperture sharing element 104. Return beam 120 then propagates to filter 121 that is highly reflective at the wavelength of return beam 120 (also highly reflective of outgoing beam 102) while being highly transmissive at other wavelengths of light which can be used for the imaging and tracking aspects of the subaperture (i.e. the filter is highly transmissive at the wavelength or wavelength band of the imaging beam 150). The return beam 120 then reflects from the filter 121 and is directed via the lens 122 into a fiber 2-axis or 3-axis steering and/or focus control assembly 123. The return beam 120 in polarization maintaining fiber 130 is then denoted in fiber 124. The polarization of polarization maintaining fiber 130 is keyed to be oriented to the "P" polarization of the return beam 120 and return beam in fiber 124. Counter-propagating to the return beam in fiber 124 is the reference beam in fiber 131. The reference beam 132, contained in fiber 131, is required to originate from the same laser as the outgoing beam 102 (in fiber 100) so that the two beams are coherent with one another. The reference beam 132, contained in fiber 131, is assumed to be composed of both polarizations, in approximately equal proportions. The fact that the reference beam 132 in fiber 131 and the return beam in fiber 124 counter-propagate in the same polarization maintaining single mode fiber 130 is denoted by the index 130 indicating grouping of the two counter-propagating beams. The reader should recall that polarization maintaining fiber supports propagation of both polarizations, however, the polarization will be randomly scrambled unless the input polarization state is aligned to the polarization maintaining fiber. Thus the return beam in fiber 124 will maintain its "P" polarization state but the reference beam in fiber 131 will have a random polarization state with roughly equal parts in the two polarization states.

The reference beam in fiber 131 is directed by the fiber 2-axis or 3-axis steering and/or focus control assembly 123 to expand the reference beam 132 in free space for collimation by the lens 122. Reference beam 132 then is directed by the filter 121 to the aperture sharing element 104. Recalling that the aperture sharing element 104 is highly reflective at the "S" polarization of the outgoing beam 102 the aperture sharing element 104 will reflect roughly half of the reference beam 132 to form an over-lapping beam 133 which is composed of the minority sample of the outgoing beam 102 (at primarily the "P" polarization state—generated by the residual polarization impurity in the outgoing beam 102) and a sample of the reference beam 132 (at the "S polarization state). The pair of beams 133 is rotated in polarization by 45 degrees by a half wave plate 134 with respect to the polarizer 135 which rejects the orthogonal polarization component of both beams, leading to an interference pattern between the minority sample of the outgoing beam 102 and the sample of the reference beam 132. This interference pattern is focused by the lens 136 onto a detector 137. The speed of the detector 137 is sufficiently high to enable rejection of high speed platform mechanical and acoustic disturbances and phase disturbances due to propagation through a laser amplifier. The detector signal 138 runs from the subaperture assembly 160 and carries the output signal of the detector.

The final aspect of importance in FIG. 1 is the imaging beam path. The imaging beam 150 is formed from either passive or active illumination of the target or target scene. In the case of the transmissive beam steering device 108 there may be sensitivity to the choice of the wavelength or wavelength band of the imaging beam 150. The imaging beam 150 wavelength must be sufficiently different from the outgoing beam 102/return beam 120 wavelength to enable isolation but must still be suitable for beam steering by the beam steering device 108. Such trades in the wavelength or wavelength band selection of the imaging beam 150 are well known to those skilled in the art. The imaging beam 150 passes through beam steering device 108 and then focusing pair lens assemblies 107 and 106 and quarter wave plate 105. Imaging beam 150 then propagates to aperture sharing element 104, which is noted at this point to be highly transmissive at the imaging beam 150 wavelength, or wavelength band. The imaging beam 150 then propagates to and passes through the filter 121 (which is highly transmissive at the imaging beam 150 wavelength or wavelength band), whereupon the beam passes through a blocking filter 151 that blocks light at the wavelength of the outgoing beam 102 and return beam 120 and transmits light at the wavelength or wavelength band of the imaging beam 150. Next the imaging beam 150 propagates to a lens 152, which focuses the imaging beam 150 onto a detector array 153. Detector array 153 will be used for subaperture beam tracking and pointing and for full aperture array imaging. Detector array 153 generates the image signal 154. Signal enter/exit points A, B, C, D, E, F, G are shown with reference to FIG. 3 below.

Figure 2:
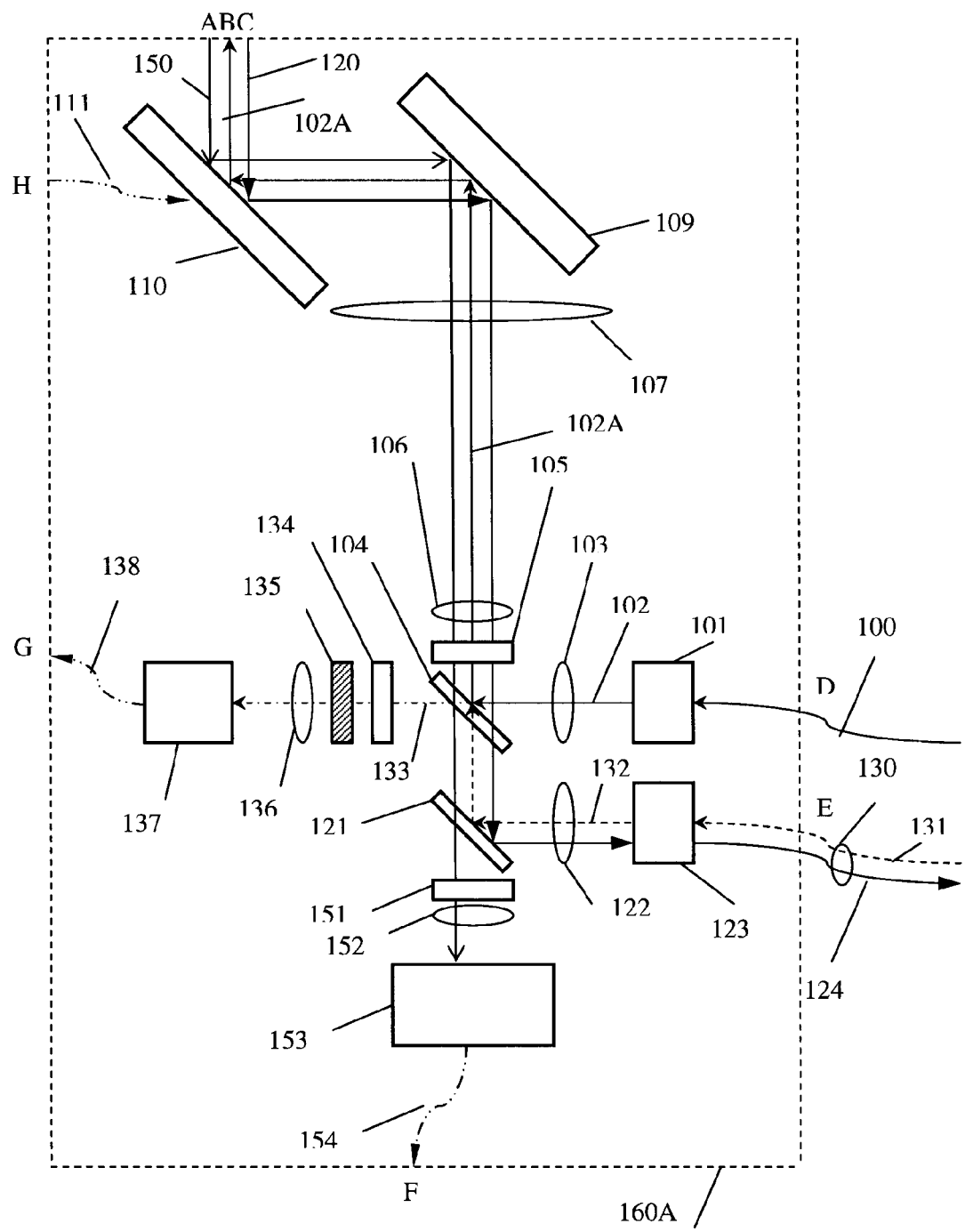
FIG. 2. is a schematic illustrating the elements of an alternate subaperture assembly equipped with the necessary optical components to implement the phasing and imaging method of the present invention; where the subaperture is depicted as having a reflective beam steering device at the entrance aperture.

FIG. 2. is a schematic illustrating the elements of an alternate subaperture assembly 160A equipped with the necessary optical components to implement the phasing and imaging method of the present invention; where the subaperture is depicted as having a reflective beam steering device at the entrance aperture. Illustrated are the necessary elements of subaperture assembly 160A to effect the beam phasing and imaging system of the present invention. FIG. 2 is shown by way of example and not of limitation. There are alternate means of displaying the laser path(s) as those skilled in the art would recognize FIG. 2 illustrates a subaperture assembly integrated with a reflective beam steering device. The difference between FIG. 1 and FIG. 2 is that the transmissive beam steering device 108 in FIG. 1 is replaced with flat mirrors 109 and 110, one or both of which have steering capability to point to the beam. Nominally the flat mirror 110 would be a steering mirror. Those skilled in the art will immediately recognize numerous other possible configurations of the focusing pair lens assemblies 106 and 107 and flat mirrors 109 and 110. For example, the beam expander formed by focusing pair lens assemblies 106 and 107 could be composed of reflective elements. One of the flat mirrors 109, 110 could be eliminated and/or placed in "small" beam space before the beam expander formed by lenses 106 and 107. The same interchanging of components could apply to the use of a transmissive beam steering device 108 and/or the mixing of reflective and transmissive components. The trades associated with selection of the appropriate beam steering device are well known to those skilled in the art and are driven by a number of factors: field of regard, field of view, optical throughput and optical fill factor over the field of regard, wavelength of the beams utilized in the system, bandwidth requirements for the beam steering device, etc. An important point to note is that a reflective beam steering device will enable greater freedom in the choice of wavelength or wavelength band of imaging beam 150. Signal enter/exit points A, B, C, D, E, F, G are shown with reference to FIG. 3 below.

Figure 3:
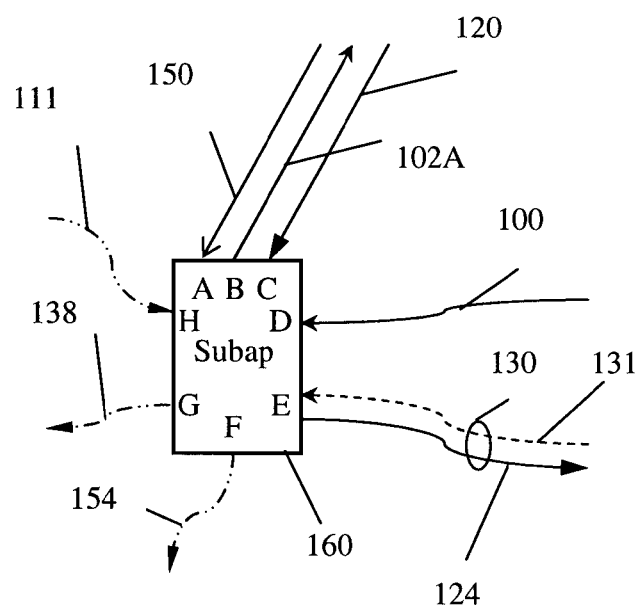
FIG. 3 is a functional "block" representation of the subaperture assembly in either FIG. 1 or FIG. 2; this "block" representation is utilized to represent the subaperture interface in more complex full system drawings.

FIG. 3 is a functional "block" representation of either subaperture assembly 160 or 160A represented in FIG. 1 or FIG. 2; this "block" representation is utilized to represent the subaperture interface in more complex full system drawings (i.e. FIG. 4 below). FIG. 3 is shown by way of example and not of limitation. Subaperture assembly 160 is used to depict the interfaces to the relatively complex drawings of subaperture assemblies 160, 160A in FIG. 1 and FIG. 2. This is shown in a manner that permits understanding of the relationships of the various interfaces of the subaperture assembly 160 to the Coherent Phased Array Beam Transmission and Imaging System. The interface point A is the input interface for the imaging beam 150. The interface point B is the output interface for the majority outgoing beam 102A. The interface point C is the input interface for the return beam 120. The interface points A, B, and C are understood by way of reference to like points shown in FIG. 1 and FIG. 2 to be coincident to one another, even if they are depicted as separate interfaces. The interface point D is the input interface for the outgoing beam in fiber 100. The interface point E is the input interface for the polarization maintaining fiber 130, which directs counter-propagating return beam in fiber 124 and reference beam in fiber 131. The interface point F is the output interface for the image signal 154. The interface point G is the output interface for the detector signal 138. The interface point H is the input interface for the beam steering control signal 111. The functional block representation of the subaperture assembly will be used in FIG. 4 below.

Figure 4:
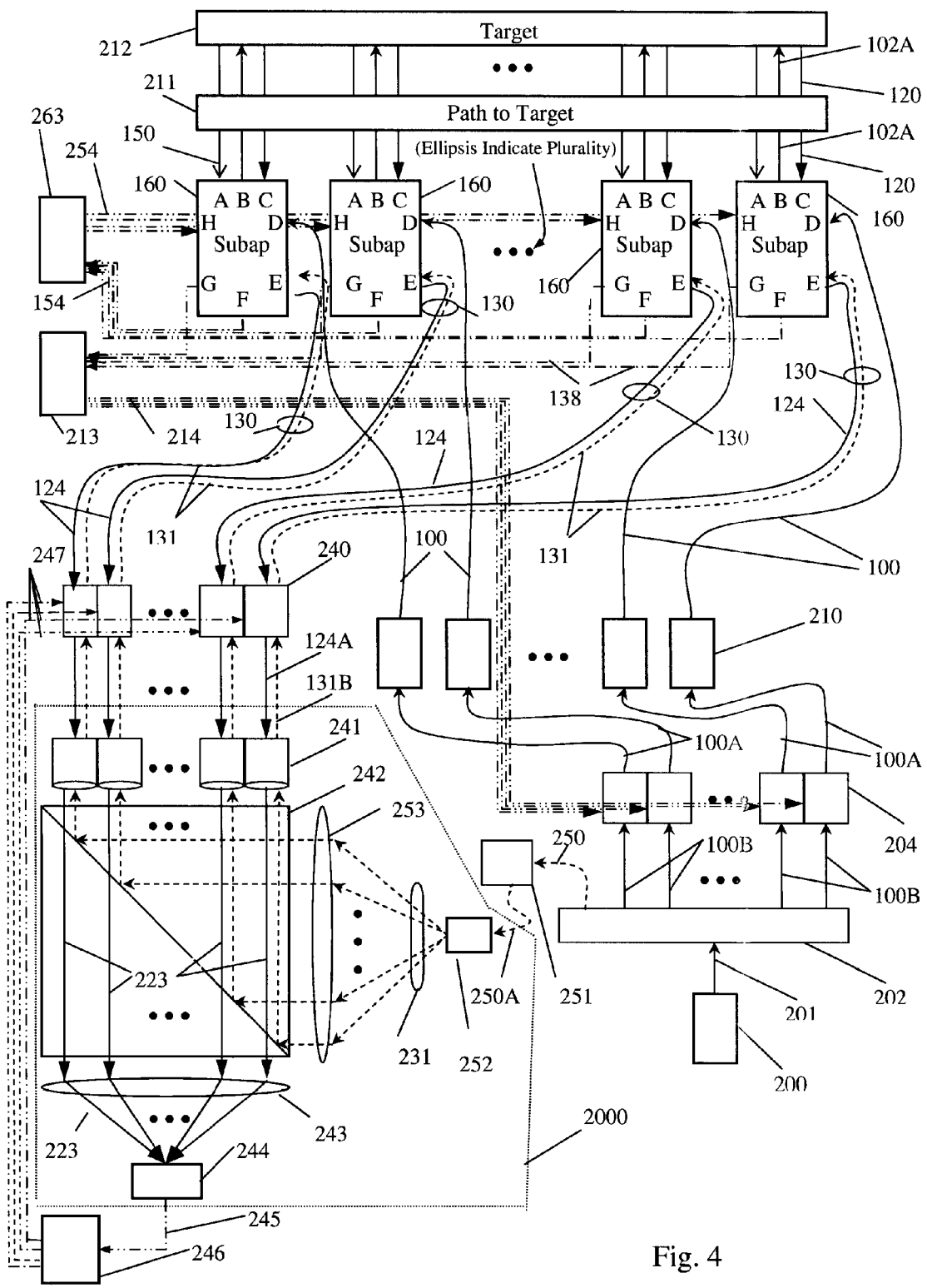
FIG. 4 is a schematic of the present invention comprised of a plurality of the subaperture assemblies illustrated in FIG. 1 or FIG. 2 (and represented by FIG. 3) and the necessary control interfaces to effect outgoing beam phasing and steering and receive beam or light imaging.

FIG. 4 is a schematic of the present invention comprised of a plurality of the subaperture assemblies 160 illustrated in detail in FIG. 1 or FIG. 2 (and represented by FIG. 3) and the necessary control interfaces to effect outgoing beam phasing and steering and receive beam or light imaging. Given the supporting description provided by FIGS. 1, 2, and 3, the full description of the Coherent Phased Array Beam Transmission and Imaging System is provided in FIG. 4 is shown by way of example and not of limitation.

Master oscillator laser 200 transmits master oscillator beam 201 (nominally in polarization maintaining single mode fiber) to a multi-beam splitter 202. Multi beam splitter 202 samples master oscillator beam 201 into the master reference beam 250 and a plurality of outgoing beams 100B. The plurality of outgoing beams 100B pass through a plurality of transmit path phase modulators 204 that are used to phase the plurality of majority outgoing beams 100A at target 212. After correction by the plurality of transmit path phase modulators 204 the plurality of majority outgoing beams 100A propagate (nominally in polarization maintaining fiber) to a plurality of amplifiers 210 which amplify the plurality of majority outgoing beams 100A to form the plurality of amplified outgoing beams 100. The plurality of amplified outgoing beams 100 are then directed via polarization maintaining fiber to the plurality of subaperture assemblies 160 at the input interface point D. Each subaperture assembly 160 directs its respective amplified outgoing beam 100 (ref. FIG. 1 or FIG. 2) to the plurality of output interface point B to form a plurality of majority outgoing beams 102A. The plurality of majority outgoing beams 102A propagate through path 211 to target 212 and then reflect back from target 212 to form the plurality of return beams 120.

The reader should note that the plurality of return beams 120 in fact is a single beam composed of the return signal from the reflection of the plurality of majority outgoing beams 102A and the term plurality refers to the effective plurality of beam paths from the individual subaperture assemblies 160 to the target 212 aimpoint. The plurality of return beams 120 are received at the plurality of each respective subaperture assembly 160 interface entry points C. Subaperture assemblies 160 each direct their respective return beams 120 to form a plurality of return beams in fiber 124 at the input/output interface points E of each respective subaperture assembly 160. The plurality of polarization maintaining fiber 130 directs the return beams in fiber 124 to a plurality of return path phase modulators 240 to form the plurality of modulated (compensated) return beams in fiber 124A. The plurality of compensated return beams in fiber 124A are directed to a plurality of collimator assemblies 241 which are precisely aligned with respect to the common reference plane of the reference beam splitter 242. The plurality of collimated return beams 223 after projection from the plurality of collimator assemblies 241 pass through the beam reference beam splitter 242. The reference beam splitter 242 is a polarizing beam splitter—highly reflective at the interface plane at the "S" polarization and highly transmissive at the "P" polarization. The plurality of collimated return beams 223 then are focused, via lens 243, into a high speed pinhole detector 244, whose output signal 245 is connected to a high speed computer 246 (which likely is a dedicated digital or analog high speed processor). The high speed computer 246 generates a plurality of control signals 247 which are used to control the plurality of return path phase modulators 240 to maximize the signal measured in the high speed pinhole detector 244. Those skilled in the art will note that there are multiple means to measure and compensate the relative phase on the plurality of return beams 223. The method illustrated here represents a straightforward approach well suited to control of in-line phase modulators with a single high speed detector and is considered the preferred method. The method of multi-dither control or stochastic parallel gradient descent is likely the best implementation of the controller (ref: 5; 6; 10). The return path phase control loop described here originating at the target to generate the plurality of return beams 120 and direct them to the high speed pinhole detector 244 for control of the plurality of return path phase modulators 240 will lead to the best estimate of coherent phasing of the return path from the target to the common reference plan of the reference beam splitter 242.

Returning to master reference beam 250, reference beam 250 is directed to master reference phase modulator 251 that cycles over a full wave of phase modulation at sufficiently high speed to enable compensation of on board phase disturbances due to mechanical and acoustic vibration as well as the plurality of amplifiers 210. This modulation speed will typically be at least 80-100 times the required compensation bandwidth to achieve sufficient rejection of the disturbances. The resultant modulated master reference beam 250A then is transmitted components of rigid sensing assembly 2000. The first internal component is a fiber transmission assembly comprised of a 2-axis or 3-axis fiber positioner 252 and lens 253 that is tightly aligned to the common reference plane of the reference beam splitter 242, thus resulting in optimal coupling of the effective plurality of reference beams 231 to the plurality of collimator assemblies 241. Again the term effective plurality refers here to the plurality of beam paths from the plurality of collimator assemblies 241 from the 2-axis or 3-axis fiber positioner 252. The plurality of reference beams 231 are then coupled into the plurality of collimator assemblies 241 to form the plurality of uncompensated reference beams in the plurality of fibers 131B, which are in turn transmitted external to rigid sensing assembly 2000 to the plurality of return path phase modulators 240. The plurality of return path phase modulators 240 impart the same phase on the plurality of uncompensated reference beams in the plurality of fibers 131B as on the plurality of compensated return path beams 124A (note that the beams all originate from the same master oscillator laser 200) to form the plurality of reference beams in fiber 131. The plurality of reference beams in fiber 131 are directed to the plurality of subaperture assemblies 160 at the input interface points E. The subaperture assemblies 160 each direct their respective reference beams in fiber 131 and minority sample of the outgoing beams in fiber 100 according to FIGS. 1, 2 to generate the plurality of detector signals 138 at the plurality of output interface points G. The plurality of detector signals 138 are directed to a controller 213 which generates (via standard high speed phase lock loop control or any number of standard methods) control signals 214 to control the transmit path of the plurality of phase modulators 210 to stabilize the outgoing beam phase path from the master oscillator 200 to the reference beam phase established by the return path compensation loop. This compensation loop results in the best estimate of stabilization of the phase of the outgoing beams 102A from the master oscillator 200 to the target 212. The only non-common path in the phasing system is the difference between the phase path from the 2-axis or 3-axis fiber positioned to the common reference plane of the reference beam splitter 242 and the phase path from the common reference plane of the reference beam splitter 242 to the high speed detector 244. The entire sensing assembly 2000 comprised of the plurality of collimator assemblies 241, reference beam splitter 242, lenses 243 and 253, high speed detector 244, and 2-axis or 3-axis fiber positioned 252 can be made highly compact and rigid and designed and toleranced for minimum possible sensitivity to vibration—thus reducing the non-common path to a magnitude many times smaller than the wavelength of light. An additional remaining potential source of non-common path is Doppler shift between the transmit path and return path due to a moving target and/or platform. This must be analyzed on a case by case basis and depends on many factors. However, in the case of the Coherent Phased Array Beam Transmission and Imaging System, because the only impact of Doppler shift is to shift the wavelength of the return light relative to the wavelength of the transmitted light (rather than Doppler shifting some much lower frequency modulation of light beam), the impact of Doppler shift even for propagation through 100 meters of fiber (much more than would be expected) is less than 0.25% of a wave of aberration for a Mach 4 directly incoming target. This sample calculation indicates that Doppler shift will not cause significant non-common path aberration. A final potential source of non-common path error is non-linear effects on the two different polarizations in the plurality of counter-propagating fiber paths 130. The reader will note that this path is all in low power, thus the magnitude of any non-linear effects will be miniscule (much smaller than the example Doppler shift calculation shown above). Thus, under the assumption of a compact and rigid sensing assembly 2000 comprised of the plurality of collimator assemblies 241, reference beam splitter 242, lenses 243 and 253, high speed detector 244, and 2-axis or 3-axis fiber positioned 252, the non-common path in the Coherent Phased Array Beam Transmission and Imaging System can be controlled to very small levels.

The final aspect of the Coherent Phased Array Beam Transmission and Imaging System as described in FIG. 4 is the imaging path which originates at the target 212 to form a plurality of imaging beams 150 which propagation through the path to the target 211 to the plurality of subaperture assemblies 160. The plurality of subaperture assemblies direct the imaging beams 150 to form a plurality of image signals 154 that are directed to the steering controller (image processor) 263. Individually, each of these image signals 154 can be utilized to generate a tip and tilt measurement for each subaperture via one of many standard processing techniques well known to those skilled in the art. The tip and tilt measurements then provide a plurality of local control signals 254 for control of the plurality of beam steering devices (108 or 109/110) in the plurality of subaperture assemblies 160. This local control signal 254 stabilizes the imaging path and thus by reciprocity the plurality of outgoing beams 102A to the target. Under the assumption of boresighting within each subaperture using standard methods well known to those skilled in the art, this stabilization is accomplished up to a global steering offset signal that will be common to the beams.

Although the methodology defined by FIG. 4 defines one embodiment of the Coherent Phased Array Beam Transmission and Imaging System, an improvement to this embodiment is necessary for optimal performance. The methodology for beam steering as described in FIG. 4 has a limitation that there will be an unknown global steering offset signal of the aimpoint of the beam due to the fact that the resolution of the subapertures is limited by the subaperture diameter and the effective imaging resolution of the full array has not yet been considered. Inclusion of a method for calculation of a global steering offset signal to be added to the plurality of local control signals 154 completes the definition of the preferred embodiment of the Coherent Phased Array Beam Transmission and Imaging System. Calculation of the global steering offset signal can only be performed by evaluation of an image of the target obtained at the resolution of the entire array and evaluation of the coherent combined beam position on the target at the resolution of the entire array. Prior to describing the calculation of the global steering offset signal for the Coherent Phased Array Beam Transmission and Imaging System, a modification of the imaging system must be described that will provide a plurality of subaperture-resolution images of both the target carried by the plurality of imaging beams 150 and a plurality of subaperture-resolution images of the outgoing beam on the target carried by the plurality of return beams 120. Example schematics of this modification are provided in FIG. 5, FIG. 6, and FIG. 7. These example schematics are provided by way of example and not limitation. Practitioners skilled in the art will be familiar with multiple possible alternate implementations that enable simultaneous imaging of the plurality of target imaging beams 150 and the plurality of return beams 120.

Figure 5:
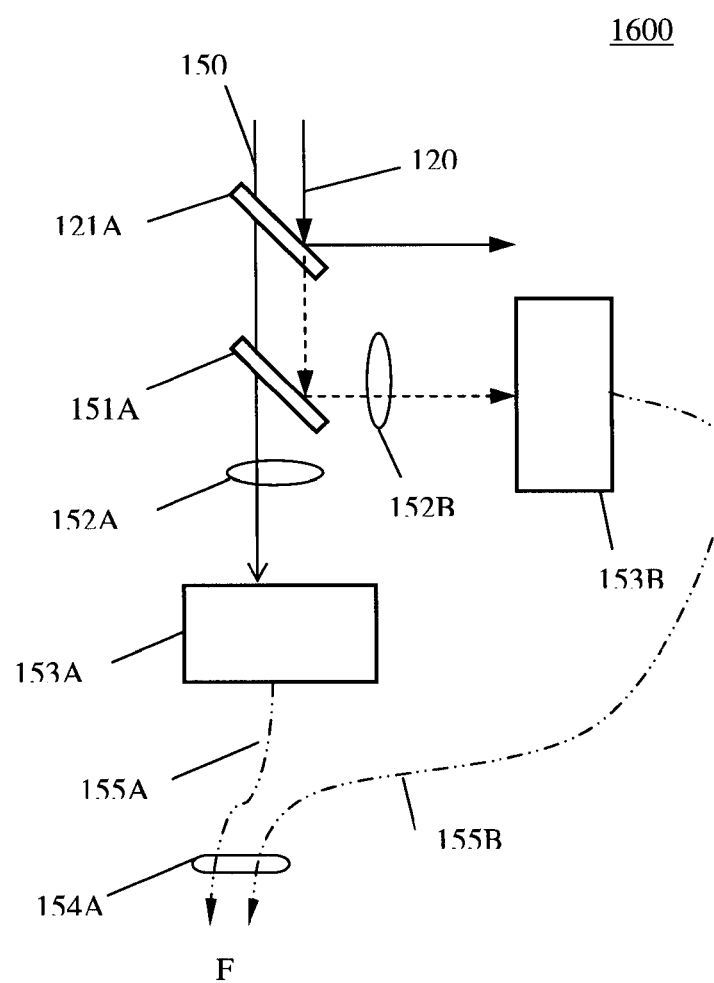
FIG. 5 is an alternate schematic of a subassembly of the imaging subaperture assembly that is included in FIG. 1 and FIG. 2.

FIG. 5 is an alternate schematic of a subassembly 1600 of the imaging subaperture assembly that is included in FIG. 1 and FIG. 2 comprised of elements 121, 151, 152, and 153 to produce the imaging signal 154. The imaging portion of the subaperture assembly in FIG. 1 and FIG. 2, as depicted, only provides for imaging of the target. The imaging subassembly 1600 depicted in FIG. 5 provides for imaging of both the target and for imaging of the return of the outgoing beam from the target by means of a beamsplitter 121A that separates the light wavelength associated with the target and the return from the outgoing beam and imaging both beams on separate cameras. The imaging beam 150 (formed from either passive or active illumination of the target or target scene) transmits through beamsplitter 121A which is highly transmissive at the wavelength of the imaging beam 150 and partially transmissive at the wavelength of the return beam 120 (the degree of partial transmissivity of the beam splitter 121A at the wavelength of the return beam 120 is to be determined based on the particular application of interest, using calculations and methods well known to those skilled in the art). The imaging beam then passes through a second beamsplitter 151A, which is highly transmissive at the wavelength of the imaging beam 150 and highly reflective at the wavelength of the return beam 120. The imaging beam 150 then is focused by the lens 152A to the imaging beam detector array 153A to produce the imaging beam image signal 155A (target image signal). The return beam 120 is partially transmitted through the beamsplitter 121A (with the reflected component of the return beam 120 being understood to follow the beam path defined in FIG. 1 and FIG. 2). The partially transmitted component of the return beam 120 then is reflected from the beamsplitter 151A and is focused by the lens 152A onto the return beam detector array 153B to produce the return beam image signal 155B. The combination of the imaging beam image signal 155A and return beam image signal 155B are depicted as the dual image signal 154A (in lieu of image signal 154 at exit point F of the subaperture assembly) for purposes of connecting FIG. 5 to the depictions of the subaperture assembly in FIG. 1, FIG. 2, FIG. 3, and FIG. 4.

Figure 6:
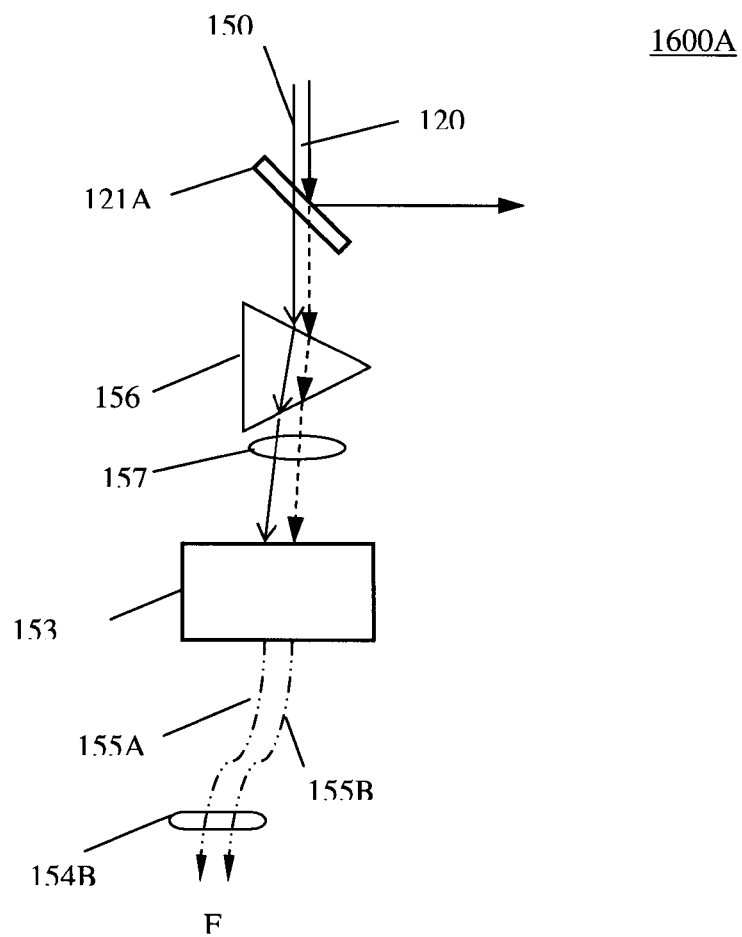
FIG. 6 is an alternate schematic of the imaging subassembly described in FIG. 5.

FIG. 6 is an alternate schematic of the imaging subassembly 1600 described in FIG. 5. The imaging subassembly 1600A depicted in FIG. 6 provides for imaging of both the target and for imaging of the return of the outgoing beam from the target on a single camera by means of a prism 156 that separates the light wavelength associated with the target and the return from the outgoing beam and imaging both beams on the detector array. The imaging beam 150 transmits through beamsplitter 121A which is highly transmissive at the wavelength of the imaging beam 150 and partially transmissive at the wavelength of the return beam 120 (the degree of partial transmissivity of the beam splitter 121A at the wavelength of the return beam 120 is to be determined based on the particular application of interest, using calculations and methods well known to those skilled in the art). The imaging beam 150 then passes through prism 156 which leads to an angular deflection of the imaging beam 150 with respect to the partially transmitted component of the return beam 120. It is to be understood by those skilled in the art that the angular separation must be large enough to separate the fields of view of the imaging beam 150 and the return beam 120. This may require consideration of trades of the camera 153 readout speed and potential introduction of a spatial filter at the system focus between focusing elements 106 and 107 (ref. FIGS. 1, 2) of each subaperture. Practitioners skilled in the art will be capable of making and understanding these trades. After passing through the prism 156 imaging beam 150 is focused by the lens 157 to the detector array 153. The return beam 120 is partially transmitted through the beamsplitter 121A (with the reflected component of the return beam 120 being understood to follow the beam path defined in FIG. 1 and FIG. 2). The partially transmitted component of the return beam 120 then passes through the prism 156 and is focused by the lens 157 to the detector array 153. The prism leads to physical displacement of the two images on the detector array (camera) 153, effectively producing two image signals: the imaging beam image signal 155A and the return beam image signal 155B, both contained and depicted as the aggregate signal 154B in the same manner as in FIG. 5.

Figure 7:
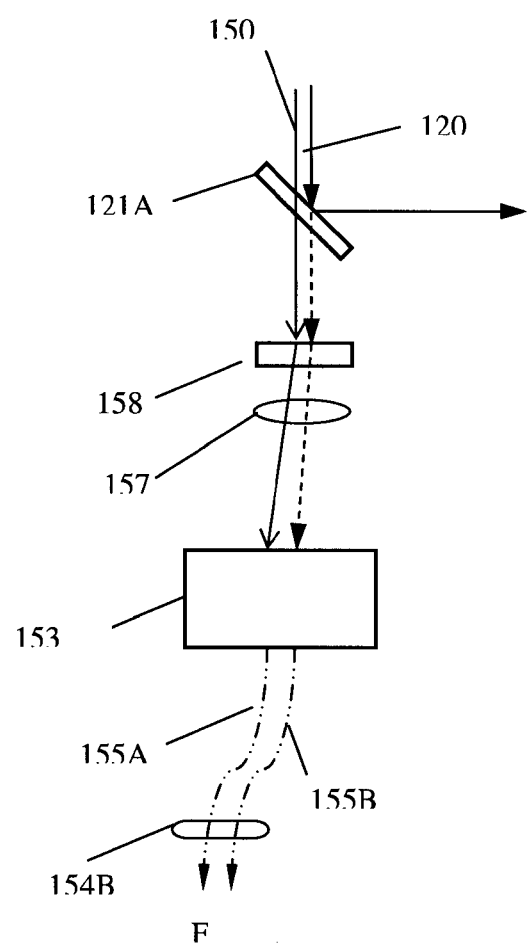
FIG. 7 is yet another alternate schematic of the imaging subassembly described in FIG. 5 and FIG. 6.

FIG. 7 is yet another alternate schematic of the imaging subassembly described in FIG. 5 and FIG. 6. The imaging subassembly 1600B depicted in FIG. 7 provides for imaging of both the target imaging beam 150 and for imaging of the return beam 120 from the target on a single camera (detector array) 153 by means of a diffraction grating 158 that separates the light wavelength associated with the target and the return from the outgoing beam and imaging both beams on the detector array 153. The imaging beam 150 transmits through beamsplitter 121A which is highly transmissive at the wavelength of the imaging beam 150 and partially transmissive at the wavelength of the return beam 120 (the degree of partial transmissivity of the beam splitter 121A at the wavelength of the return beam 120 is to be determined based on the particular application of interest, using calculations and methods well known to those skilled in the art). Imaging beam 150 then passes through a diffraction grating 158, which leads to an angular deflection of the imaging beam 150 with respect to the partially transmitted component of return beam 120. It is to be understood by those skilled in the art that the angular separation must be large enough to separated the fields of view of the imaging beam 150 and the return beam 120. This may require consideration of trades of the camera readout speed and potential introduction of a spatial filter at the system focus between focusing elements (ref. 106 and 107 of FIGS. 1, 2) of each subaperture. Practitioners skilled in the art will be capable of making and understanding these trades. After passing through the diffraction grating 158, imaging beam 150 is focused by the lens 157 to the detector array 153. Return beam 120 is partially transmitted through the beamsplitter 121A (with the reflected component of the return beam 120 being understood to follow the beam path defined in FIG. 1 and FIG. 2). The partially transmitted component of the return beam 120 then passes through the diffraction grating 158 and is focused by the lens 157 to the detector array 153. Diffraction grating 158 leads to physical displacement of the two images on the camera (detector array 153), effectively producing two image signals: the imaging beam image signal 155A and the return beam image signal 155B, both contained and depicted as the aggregate signal 154B as in FIG. 6 and in the same manner as dual image signal 154 shown in FIG. 5.

Figure 8:
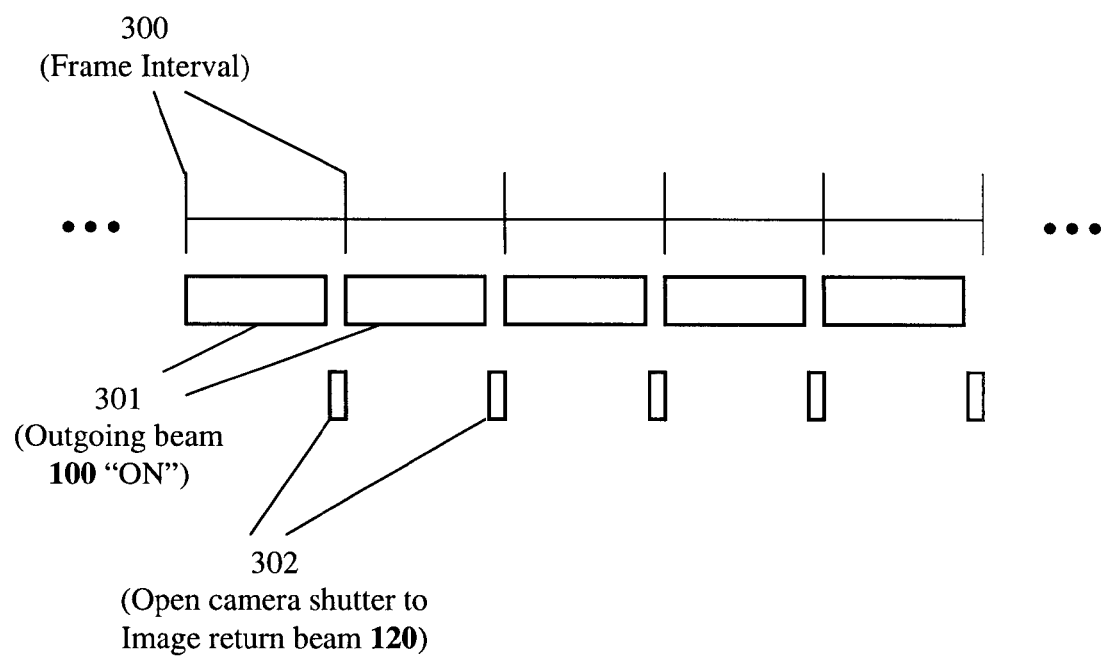
FIG. 8 is a schematic block diagram illustrating one method to ensure isolation of scatter within the optics in the subaperture beam train to isolate the outgoing high power beam from the return beam image signal, which returns from the target, in order to enable imaging of the return beam from the target.

Prior to proceeding with description of the means to process this data, it is necessary to provide an example description of a means to avoid detector signal saturation for the return beam image signal 155B. FIG. 8 is an example timing diagram illustrating a means to avoid detector signal saturation for the return beam image signal 155B. The technical problem addressed in FIG. 8 is that the random scatter from the optics in the subaperture beam train that results from the outgoing beam 102 can lead to a background signal on the imaging detector array 153, 153A, or 153B. If the scatter signal level is large enough, then the imaging beam 150 and return beam 120 may not be detectable within the shot noise associated with the scatter induced background. Practitioners skilled in the art will be familiar with the calculations to be performed to assess the degree of this technical problem. FIG. 8 depicts a frame interval time 300 that corresponds to the frame rate of the return beam imaging detector array 153, 153A, or 153B. The outgoing beam 100 will be "ON" or allowed to proceed through the system during the outgoing beam 100 "ON" time illustrated by 301. The outgoing beam 100 "ON" time should be maximized in general but this will be dependent on the specific application of interest. The outgoing beam 100 should be blocked or turned off by any of standard methods known to those skilled in the art for camera integration time intervals 302 that allow for imaging of the return beam 120 from the target. The method selected for de-activating the outgoing beam 100 must be cognizant of maintaining laser and/or amplifier stability. During camera integration time intervals 302 the shutter of the return beam imaging detector array 153, 153A, or 153B will be open to enable imaging of the return beam 120. The reader should note that the timing of the frame interval 300 and the camera integration time intervals 302 must be such that time of flight to the target and back does not correspond to a time in which no return signal from the target will be measured. This is straightforward to ensure for those skilled in the art.

FIG. 5, FIG. 6, and FIG. 7 all provide example descriptions of means to obtain a plurality of subaperture-resolution images of both the target carried by the plurality of imaging beams 150 and a plurality of subaperture-resolution images of the outgoing beam on the target carried by the plurality of return beams 120.

FIG. 8 is a schematic block diagram illustrating one method to ensure isolation of scatter within the optics of the subaperture beam train to isolate the outgoing high power beam 100 from the return beam image signal 120, which returns from the target, in order to enable imaging of the return beam from the target. FIG. 8 provides an example timing diagram illustrating a means to prevent detector saturation for the return beam image signal 150 that may be necessary, depending on the application (practitioners skilled in the art can perform the necessary calculations to evaluate the necessity of this additional modification).

Figure 9:
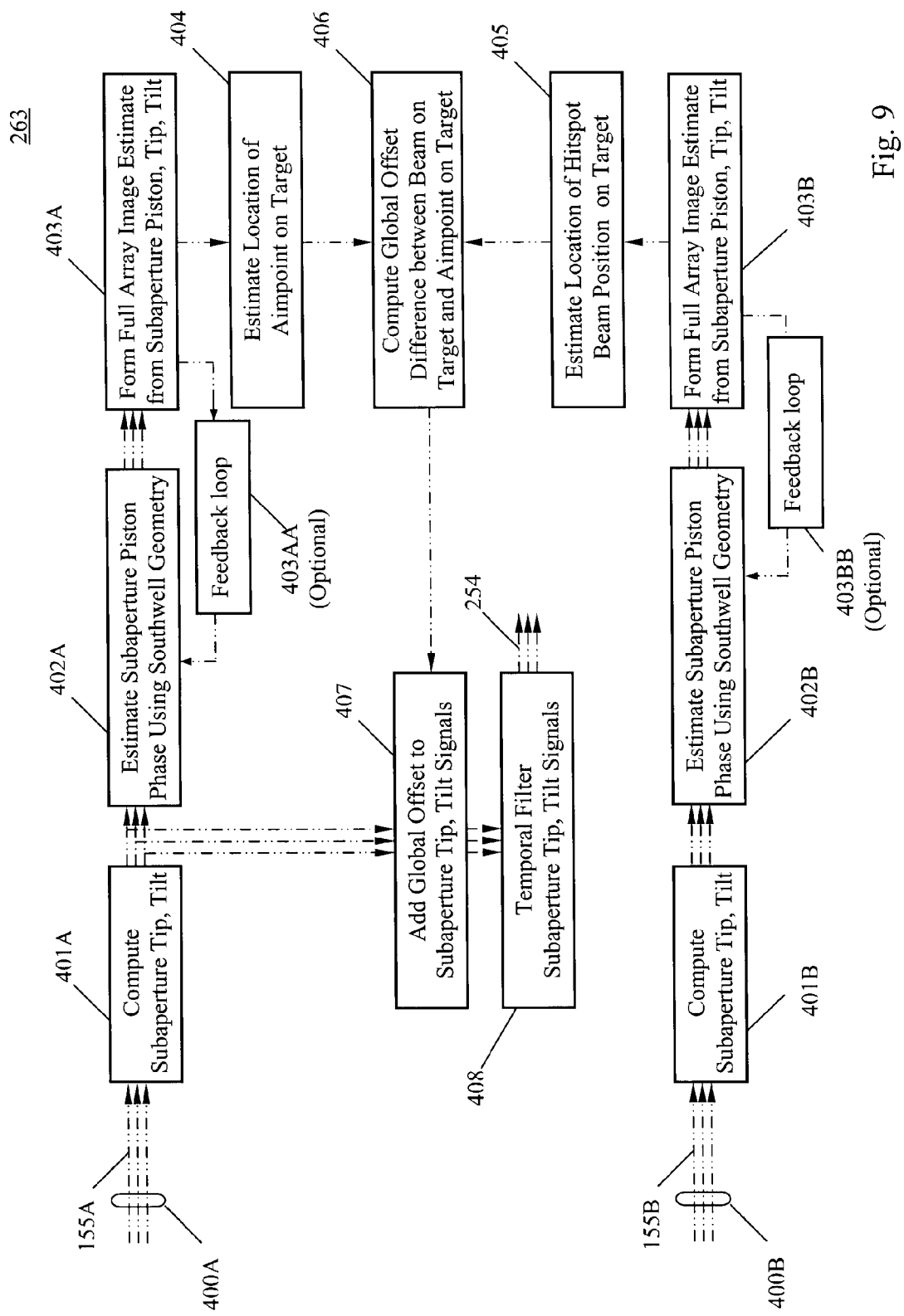
FIG. 9 is a flow chart illustrating the process steps to obtain an image of the target and an image of the return beam from the target at the resolution of the full array and use this full array resolution image to compute a global offset tilt signal to maintain the focused beam on the target aimpoint.

FIG. 9 is a flow chart illustrating the process steps to obtain an image of the target and an image of the return beam from the target at the resolution of the full array and use this full array resolution image to compute a global offset tilt signal to maintain the focused beam on the target aimpoint. Given the example methods in FIG. 5, FIG. 6, FIG. 7, and FIG. 8, a method to compute the global steering offset signal to be added to the plurality of local control signals 254 (ref. FIG. 4) is described. This final important detail, defined by the schematic block diagram in FIG. 9, is the last challenge addressed by the Coherent Phased Array Beam Transmission and Imaging System and in conjunction with FIG. 4 defines the preferred embodiment for the Coherent Phased Array Beam Transmission and Imaging System.

FIG. 9 represents the processing steps of imaging processor 263 (ref. FIG. 4). In step 400A, the plurality of target image signals 155A are received and then each image is processed in step 401A to compute an estimate of the x and y tilt on each subaperture. The estimate can be computed using any number of methods well known to those skilled in the art, including centroid calculation, threshold centroid calculation, matched filter calculation, edge detection methods, etc. The selected method will be dependent on the application of interest-however, the recommended preferred embodiment is a matched filter calculation utilizing either one of the subaperture images as a reference or the shift- and added averaged of the subapertures as a reference (where the shift and add technique is well known to those skilled in the art). The recommended procedure nominally used in step 402 is to form an estimate of the piston phase using gradient optimization methods to improve image Strehl ratio or image sharpness using methods well known to those skilled in the art.

Given the piston phase and x and y tilt measurements, an estimate of the full array image can be formed in step 403A according to the following:
1. Given two dimensional subaperture image data, $I_k$, where k denotes the subaperture index with piston phase $\phi_k$ and x and y tilt $s_{x,k}$ and $S_{y,k}$.
2. Interpolate image data, $I_k$, from the subaperture imaging sensor two dimensional x and y grid of coordinates, $x_k$ and $y_k$, to an over-sampled high resolution x and y two dimensional grid of coordinates X and Y (where selection of the grid spacing on X and Y is determined by methods well known to those skilled in the art), to form the over-sampled subaperture image $J_k$.
3. Compute $M_k=J_k \exp[i\phi_k+i(2\pi/\lambda)(Xs_{x,k}+Ys_{y,k})]$.
4. Form the global image $I_T=\Sigma_k M_k$, k=1 to K, where K is the total number of subaperture images utilized.

Once the full array target image estimate, $I_T$, is formed in step 403A, the location of the aimpoint on the target can be estimated in step 404. This estimate is formed by methods well known to those skilled in the art and is denoted by $a_x$ and $a_y$.

The same processing described above in steps 401A, 402A, and 403A (and optional step 403AA) is repeated in steps 401B, 402B, and 403B (and optional step 403BB). These steps are applied to the plurality of return beam images 155B, received in step 400B, to form a full array return beam image estimate, $I_R$, in step 403B. This image $I_R$ can then be used to form an estimate of the hitspot position on the target, in step 405, using methods well known to those skilled in the art. The hitspot position on the target is denoted $h_x$ and $h_y$.

Given the aimpoint and hitspot estimates, the global offset signals $g_x=a_x-h_x$ and $g_y=a_y-b_y$ are computed in block 406. These represent the difference between the return beam images and imaging beam image signals. These global offset signals are then added to the subaperture x and y tilt signals in step 407 prior to temporal filtering in step 408 and before generating the plurality of beam steering signal 254 (ref: FIG. 4) that are passed on to each subaperture's beam steering device. This closed loop process stabilizes the beam on the target aimpoint using the full resolution of the Coherent Phased Array Beam Transmission and Imaging System, ensuring maximum energy at the target aimpoint.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A Coherent Phased Array Beam Transmission and Imaging System for end-to-end compensation of a plurality of subaperture transceivers that form a plurality of laser beams through a turbulent medium to a non-cooperative target, the system comprising:

A. A first control loop comprising:
  a master oscillator producing a master oscillator beam;
  a beam splitter to divide said master oscillator beam into a reference beam and a plurality of outgoing beams;
  a plurality of first phase modulator control devices functioning to control a phase of each of the plurality of outgoing beams;
  a plurality of amplifiers functioning to amplify each of the plurality of outgoing beams;
  a plurality of subaperture transceivers functioning to direct the plurality of outgoing beams through a path to a target;
  a plurality of return beams reflected from the target back to the plurality of subaperture transceivers functioning to direct the return beams to a plurality of second phase modulator control devices, each functioning to control a phase of the plurality of return beams;
  the plurality of second phase modulator control devices passing the plurality of return beams into a sensing assembly which functions to focus a coherent sum of the plurality of return beams onto an internal high speed detector;
  said internal high speed detector functioning to produce an electronic signal and pass said electronic signal to a high speed computer;
  said high speed computer functioning to control said plurality of second phase modulator control devices in a closed loop fashion to maximize the coherent sum of the plurality of return beams onto the high speed detector;

B. A second control loop comprising:
  a third phase modulator receiving said reference beam and directing said reference beam into the sensing assembly;
  said sensing assembly then passing the reference beam to the plurality of second phase modulator control devices and into the plurality of subaperture transceivers functioning to form a plurality of interference patterns between the reference beam and the plurality of outgoing beams producing a plurality of detector signals;
  said detector signals passed to the high speed computer functioning to control the plurality of first phase modulator control devices such that the phase of an outgoing beam will be locked to a phase of the reference beam at an aperture sharing element within each subaperture transceiver;

C. A third loop comprising:
  a return image from the target;
  said return image passing through a path to the plurality of subaperture transceivers and focused to a plurality of cameras or detector arrays internal to each subaperture transceiver;
  said plurality of subaperture transceivers forming an electronic image signal and passing said electronic image signal to an image processor; and
  said image processor controlling a plurality of beam steering devices internal to the plurality of subaperture transceivers functioning to keep the plurality of outgoing beams locked onto the target and to maintain an outgoing beam hit spot on a target aimpoint with a coordinated imaging resolution of the plurality of the subaperture transceiver.

2. The system of claim 1, wherein the subaperture transceiver comprises:

a set of elements to steer and collimate an outgoing laser beam to an internal beam steering device;

said beam steering device having a steering control signal including the x and y tilt commands for control the pointing of the beam to a target;

the beam steering device receiving a return beam (reflected from the target) and steering the return beam to a two or three axis steering or focus control element and exiting through a fiber;

receiving a reference beam via a fiber and directing said reference beam to the two or three axis steering or focus element;

reflecting a portion of the reference beam and a portion of the outgoing laser beam to form an interference pattern to a detector to form an output detector signal;

receiving an imaging beam created by active or passive illumination of the target;

passing the imaging beam through the internal beam steering device and other internal elements to an internal detector array functioning to generate an image signal.

3. The system of claim 2, wherein the beam steering device further comprises a set of flat mirrors, one or both of which have the capability to point the beam.

4. The system of claim 2, wherein additional internal detector arrays produce a combination beam image signal produced from the target imaging beam and the return beam.

5. The system of claim 2, wherein an internal prism is added for angular deflection of the imaging beam with respect to the return beam leading to a physical displacement of two images on a detector array.

6. The system of claim 2, wherein a diffraction grating element produces an angular deflection of the imaging beam with respect to the return beam leading to a physical displacement of two images on a detector array.

7. The system of claim 2, wherein a frame interval is controlled to correspond to the frame rate of the return beam imaging detector array such that the outgoing beam will be 'ON' for a portion of the frame interval and 'OFF' for the remaining portion of the frame interval.

8. The system of claim 2, wherein the return beam from the target will be imaged through the detector array during the portion of the frame interval when the outgoing beam will be 'OFF'.

* * * * *

UNITED STATES PATENT AND TRADEMARK OFFICE
CERTIFICATE OF CORRECTION

PATENT NO.        : 8,575,528 B1                                    Page 1 of 1
APPLICATION NO.   : 13/038584
DATED             : November 5, 2013
INVENTOR(S)       : Jeffrey D. Barchers It is certified that error appears in the above-identified patent and that said Letters Patent is hereby corrected as shown below:

In the Specification

In Col. 1, line 14, the section entitled STATEMENT REGARDING FEDERALLY SPONSORED RESEARCH OR DEVELOPMENT should read as follows:

This invention was made with Government support under Contract FA9451-11-C-0193 awarded by the United States Air Force. The Government has certain rights in the invention.

Signed and Sealed this
Thirteenth Day of May, 2014

Michelle K. Lee
*Deputy Director of the United States Patent and Trademark Office*